United States Patent [19]

Roppel et al.

[11] Patent Number: 6,009,491
[45] Date of Patent: Dec. 28, 1999

[54] DATA TRANSMISSION METHOD HAVING A DATA LINE WHICH IS SEPARATE FROM A DATA BUS AND IS DESIGNED AS A CHAIN

[75] Inventors: Rüdiger Roppel, Hildesheim; Detlef Rode, Hemmingen, both of Germany; Jürgen Althoff, Braya, Portugal

[73] Assignee: Robert Bosch GmbH, Stuttgart, Germany

[21] Appl. No.: 08/876,404

[22] Filed: Jun. 16, 1997

[30] Foreign Application Priority Data

Jun. 20, 1996 [DE] Germany ............................ 196 24 528

[51] Int. Cl.⁶ ...................................................... G06F 13/40
[52] U.S. Cl. ............................... 710/128; 710/21; 710/65; 710/107; 307/149; 327/142
[58] Field of Search ........................ 395/822, 287, 395/309, 841; 307/149; 327/142; 210/2, 21, 65, 129, 107, 128

[56] References Cited

U.S. PATENT DOCUMENTS

| 4,236,086 | 11/1980 | Hoebel | 307/149 |
| 4,688,168 | 8/1987 | Gudaitis et al. | 395/287 |
| 4,914,574 | 4/1990 | Terada | 395/309 |
| 5,062,076 | 10/1991 | Ho et al. | 395/841 |
| 5,574,393 | 11/1996 | Nguyen et al. | 327/142 |
| 5,588,123 | 12/1996 | Loibl | 395/287 |

FOREIGN PATENT DOCUMENTS 1451367  9/1976  United Kingdom .

*Primary Examiner*—Thomas C. Lee
*Assistant Examiner*—Harold Kim

[57] ABSTRACT

A method for controlling the transmission of information between electronic components in a motor vehicle, which components can be either data sources or data sinks, in which a cascade design is used to facilitate the transmission of information. By separating the control signal from the actual streams of data, a flexible, chain type of structure is obtained.

18 Claims, 3 Drawing Sheets

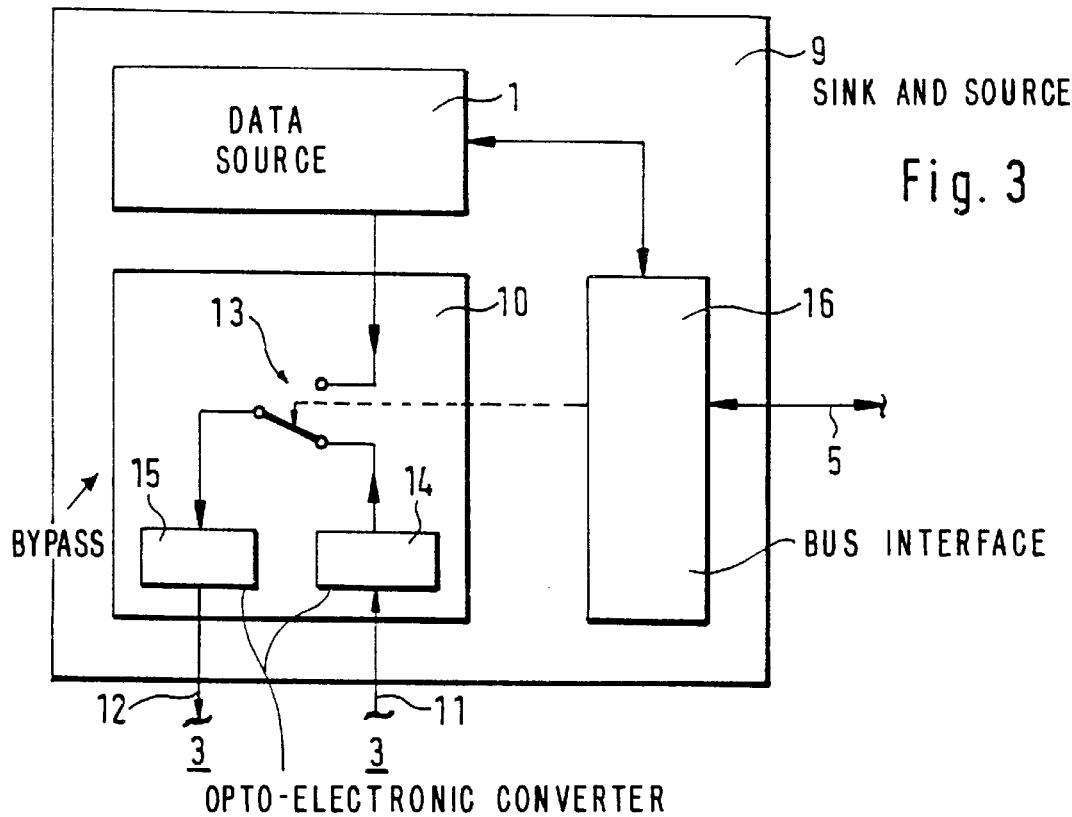
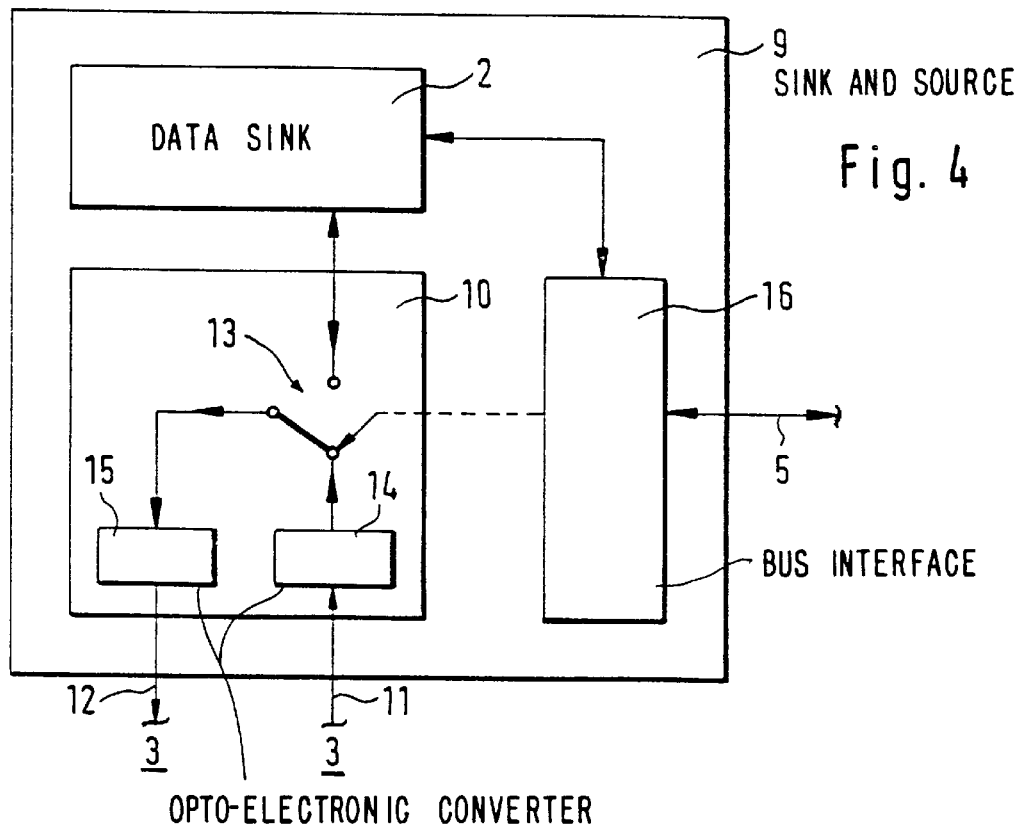

DATA TRANSMISSION METHOD HAVING A DATA LINE WHICH IS SEPARATE FROM A DATA BUS AND IS DESIGNED AS A CHAIN

BACKGROUND OF THE INVENTION

The invention proceeds from a method for controlling the transmission of data between electronic components, preferably in a motor vehicle, which either supply information or process it, and which are linearly connected to each other and to a controlling component by a data bus.

Methods for controlling the transmission of data between electronic components in a motor vehicle are already known, i.e., methods which help solve the problem of finding space for motor vehicle components which provide information and entertainment by increasing their functionality and complexity in spite of the high level of their integration. This approach leads to networked systems and decentralized components. It is necessary not only to control and monitor information but also to transmit audio and video data as well as possibly the data stored on a CD-ROM (called "data" or "useful data" in the following). A modular concept, which allows the data to be transmitted over coaxial cables or fiber-optic waveguides, usually made of plastic, is required for the transmission of these data. For cost reasons, standard communications protocols are used for these transmissions.

A networking of components in motor vehicles in the form of a star topology is known. In this design, several data sources are connected to a data sink. The number of these sources cannot be exceeded by the limited number of free inputs. In addition, a large amount of space is required, and the large number of plug contacts which the data sink must have is also disadvantageous.

Optical ring structures are also known, in which both data and control/monitoring information are transmitted over the transmission medium. Each component, whether data source or data sink, has an optoelectronic converter at its input and an electro-optic converter at its output. A protocol processor makes it possible for the data to be read in and out. In a ring structure, the data stream must be clocked. The disadvantage of a ring topology and of the transmission of all the data over the same medium is the fact that a break at any point puts the entire network out of service. Components in a ring structure which have no data burden of their own beyond information for control and monitoring, e.g., remote controls, have an oversized interface.

SUMMARY OF THE INVENTION

According to the invention, a component for transmitting information and at least one component for processing information are actively connected by the controlling component. Information is fed into a data line which is separate from the data bus and connects all the components together.

The invention offers the advantage that pure data transmission is disconnected from the control and monitoring function, in that the control lines and the data lines are connected separately to the components of the network. As a result, a simple cascade structure of the components is obtained, in which the sequence of components in the chain is arbitrary and in which the number of components is not restricted by the number of plug-in locations. A break in the data line leads to the loss of the data of the components which are on the other side of the break with respect to the data source, but the rest of the components continue to work normally. The two components serving as the source and the sink of information are actively connected by way of the control bus.

In a cascaded design, it is advantageous that the data line passes by way of bypass circuits through the individual networked components which are not end components. This offers the advantage that a simple circuit unit does the job of connecting the components, and there is no need actively to generate clock pulses with a phase-locked loop. Thus the electronic complexity of a component of the data network is reduced.

Because of the simple design of the connection, it is possible to transmit digital and/or analog data; the system can thus be upgraded to meet increasing requirements. Standard communications protocols and methods can be used. For example, the use of the S/P-DIF protocol for digital data transmission with self-timed encoding is advantageous.

It is advantageous for the components used to implement the method to have a bypass circuit with a simple switch, which connects the output and the input of the component to the functional unit.

It is also advantageous for the data sources which are used as end components to have only a data output, which means that there is no need for a bypass circuit. End components which work as data sinks require only a data input.

The data cascade is advantageously controlled by way of a control line, which is connected to a microcomputer and to a bus interface at each component. It is advantageous for the control line to be realized as a CAN (Controller Area Network) bus, and the control component can either be a separate unit or be integrated into some other component.

BRIEF DESCRIPTION OF THE DRAWING

FIG. 3 shows the design of a transmission component in the data cascade.

FIG. 4 shows the design of a receiving component in the data cascade.

DESCRIPTION OF THE EXEMPLARY EMBODIMENT

Figure 1:
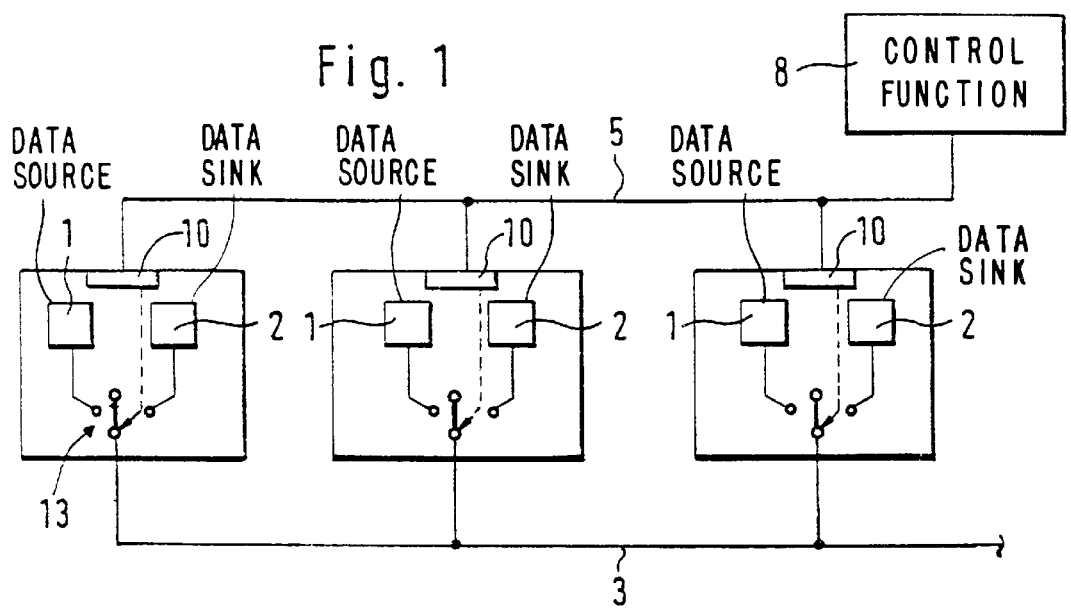
FIG. 1 shows a linear network system according to the invention.

FIG. 1 shows the most general form of a network of components. The network system according to the invention assumes that the control and monitoring data are separated in a communications sense from the useful data. The data are transmitted over data lines 3. The transmission itself is advantageously based on a digital communications protocol, which uses self-timing encoding. Encoding of this type is, for example, biphase mark encoding, which makes possible the synchronous transmission of data over line 3. Of course, the cascade according to the invention can also transmit analog signals such as audio-NF.

Control occurs via the MMI master (Man-Machine Interface) 8. This master 8 is responsible for controlling the cascade. The master can be an independent component as shown in FIG. 1, or it can be integrated into any one of the components of the data cascade. The master represents the interface with the user. An MMI master monitors and stores all conditions which are relevant to the networking of the data. If nonvolatile memory (e.g., an EEPROM) is used to store the cascade conditions, then in the case of an audio cascade, for example, the last source which was listened to before the system was turned off will be heard when the system is turned back on again. Master 8 is connected via data line 5 to the individual components of the data cascade. In this embodiment, a data source 1 and a data sink 2 are present initially in each component. Switch 13 connects the function selected by control unit 8 via an input/output to data line 3.

Figure 2:
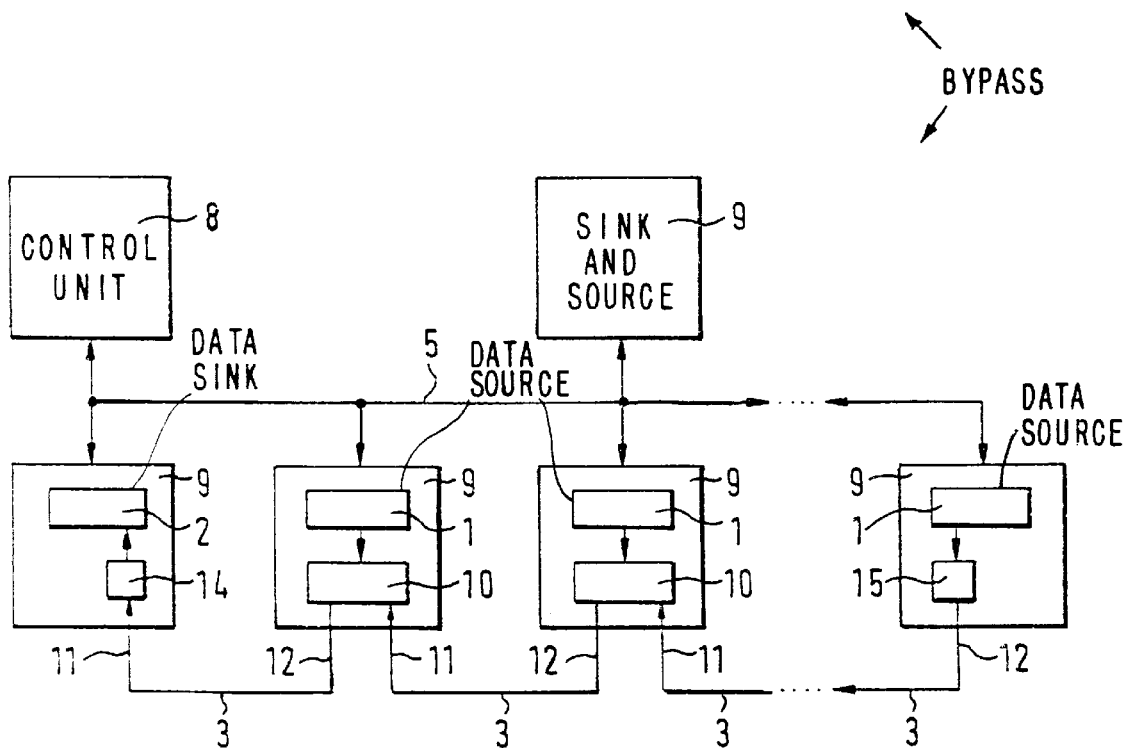
FIG. 2 shows how bypass circuits are used to create a chain.

FIG. 2 shows a special embodiment which makes it easier to connect the components to the data line and thus simplifies their replacement. Components 9 each represent either a data source 1 or a data sink 2, but a component with pure control functions is also shown. Within a cascade, each component 9 has a data output 12 and a data input 11 intermediaries 14 and 15. The two inputs and outputs are wired to source 1 by means of a bypass 10. The end components can be data sources, which in that case have only a data output 12. Components 9 which are not data sources or data sinks and which only make control information available are connected to control bus 5. In general, a data sink is found at the end of the cascade. Data sources and data sinks contain all the necessary sending and receiving interfaces. If there is only one data sink, the sequence of components in the data cascade is arbitrary.

FIG. 3 shows the design of a component 9 with a data source 1. Control and monitoring bus 5 is connected in the component to a bus interface 16, which is controlled by a microprocessor. Data source 1 with its encoding circuit communicates via the microprocessor system with the control unit. Component 9 also has a bypass circuit 10. Input 11, which in this case is connected to a fiber-optic waveguide, must be provided with an opto-electronic converter 14. Switch 13 can connect input 11 to output 12 via an additional opto-electronic converter 15. In addition to the bypass on an electrical plane described in this exemplary embodiment, there is switch for the bypass function.

FIG. 4 shows a circuit for use with a data sink not installed as an end component; the circuit therefore also has a bypass. In general, the MMI master activates the source such as a CD changer and the data sink by sending commands over the control bus.

In the case of a navigation device, data source 1 informs the master of the data cascade via control and monitoring bus 5 that driving instructions are available and that the data are ready for transmission to the data sink. The instruction actively to connect this data source arrives over the control and monitoring bus. Then switch 13 to the data source is flipped, and the signals of the data source pass via electro-optic converter 15 to output 12 and data line 3. There is never more than one source active in the cascade; all the other components pass the data stream through their bypass circuits 10. An essential feature of the bypass circuit is its design as a simple circuit component which allows the data stream to pass through without clock regeneration. The number of maximum allowable components in a data cascade is determined by the quality of transmission lines 3 and interface circuits 14, 15. When suitable fiber-optic waveguide systems, e.g., plastic fiber-optic waveguides, and interface circuits are used, up to 10 components can be connected in the cascade.

Relative to the cascading of the components, four different types of components 9 can be distinguished:

(a) Data sinks (end components): The data sink has only an input 11. In principle, several data sinks are possible in a cascade. As a result, however, the networking sequence is no longer arbitrary.

(b) Cascadable data sources: Each component has a data input 11 and a data output 12. In addition, a bypass circuit 10 is integrated into the component; this circuit consists essentially of a two-way switch, made according to CMOS technology, for example, with two positions: internal source active/arbitrary external source active. The position of the switch is monitored by the microprocessor system with its bus interface and controlled by MMI master 8 over control and monitoring bus 5. If there is a problem with the bus interface, the switch is automatically shifted back to the default setting, namely, pass-through.

(c) Noncascadable data source (end component): An end component has only a data output 12. Precisely one end component can be present in each system. Whether a component is designed as an end component or not depends in general on the configuration probability and the probable installation site.

(d) Components which do not process data within the cascade: Components which have no connection for a data cascade can still be operated in the network by way of control and monitoring bus 5.

In principle, the cascade is suitable both for coaxial cables and for fiber-optic waveguides. In both cases, an interface circuit (e.g., potential separation, signal conversion from optical to electrical, etc.) is required. In the cascade, the same communications protocol should be used for all of the components, but in the case of audio transmission, different sampling rates can be present in the components. The allowable sampling rates depend only on the communications protocol used and on the PLL range of the data sink. If different communications protocols are used within a cascade, the sink must be designed to handle all the protocols used, at additional expense.

Figure 5:
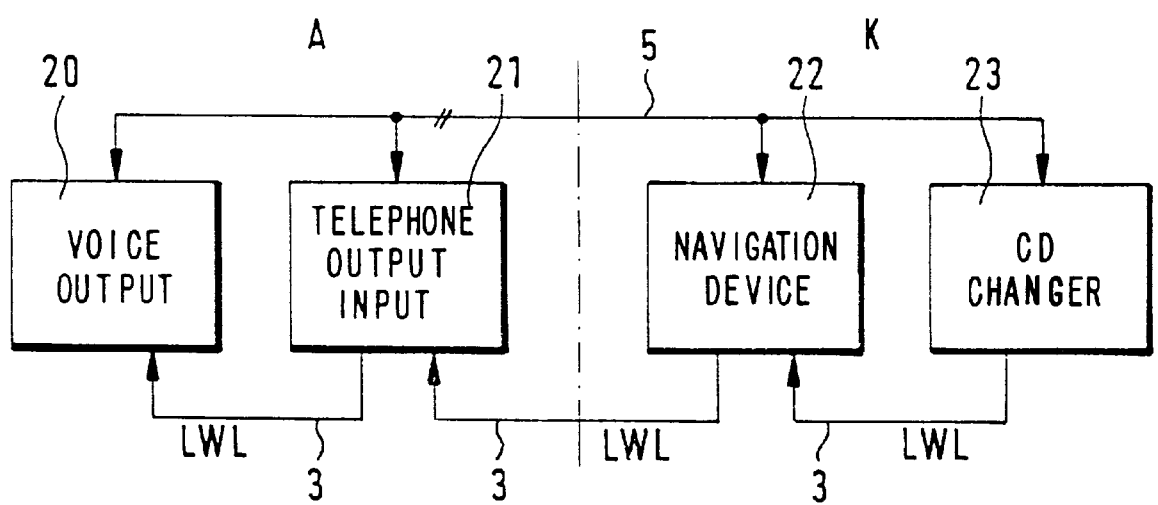
FIG. 5 shows an exemplary embodiment of the data transmission system.

FIG. 5 shows a concrete embodiment of a network in an automobile. On dashboard A of the motor vehicle there is a voice output 20, integrated into a radio device, for example, and a telephone output/input unit 21. These two data sinks are connected via a control bus 5 to the components installed in the trunk. Components for which no direct user input is required are installed in the trunk of the vehicle. In the present example, these can be navigation devices 22 and a CD changer 23. The data of the components are transmitted by way of fiber-optic waveguides 3 to the data sink, in this case voice output 20, which also contains the MMI. The controller area network (CAN) is used as a basis for the control and monitoring bus. The audio data themselves are sent over the data line, i.e., the fiber-optic waveguide cascade. The communications protocol for the audio data is, for example, an S/P-DIF protocol, which means that a stereo channel is available.

The data cascade can also be used in the home for multimedia applications. Any desired system configurations are conceivable for this purpose. In principle, the data cascade is also suitable for video applications, especially when compression and transmission methods such as MPEG are available.

We claim:

1. Method for controlling the transmission of information between electronic components, preferably in a motor vehicle, which either supply information or process it and which are connected linearly to each other and also to a controlling component via a data bus, said method comprising actively connecting a component for transmitting the information and least one component for processing the information by the controlling component, and feeding the information into a data line, which is separate from the data bus and connects all the components to each other wherein the data line is designed as a chain, such that data are sent along the chain via bypass circuits.

2. Method for controlling the transmission of information according to claim 1 wherein the data line transmits information which is in analog and/or digital form.

3. Method for controlling the transmission of information according to claim 1 wherein standard communications protocols are used for the transmission of information between two components via the data line.

4. Method for controlling the transmission of information according to claim 1 wherein the information is transmitted serially from point to point by means of self-timed encoding.

5. Method for controlling the transmission of information according to claim 1 wherein the information is transmitted in the standard S/P-DIF format.

6. Method according to claim 1 wherein components which are not end components have a bypass circuit with an input connection and an output connection to the data line and also a connection to the functional unit (transmitting or processing unit), which, upon activation, is connected either to the output or to the input depending on the function.

7. Method according to claim 6 wherein the components which are end components have an input or an output with a connection to the functional unit.

8. Method according to claim 6 wherein digital information is sent without clock regeneration through the bypass circuit, where switching can be carried out by either electrical or optical means.

9. Method according to claim 6 wherein the data line is a plastic fiber-optic waveguide, and in that the data inputs and outputs are connected to the electrical circuit by way of optocouplers.

10. Method according to claim 6 wherein the component has a connection to the control line via a microcomputer and a bus interface.

11. Method according to claim 6 wherein the control line is realized by a CAN bus.

12. Method according to claim 6 wherein the components are controlled by a separate control component.

13. Method according to claim 6 wherein the control function is integrated into a component.

14. Apparatus for controlling the transmission of information between electronic components, said apparatus comprising:
 a transmitting component for transmitting information;
 at least one processing component for processing information;
 a controlling component;
 a data bus actively connecting said transmitting component, said at least one processing component, and said controlling component, and a data line which is separate from the data bus and connects all the components together and is designed as a chain, with data being sent along the chain via bypass circuits.

15. Apparatus according to claim 14 wherein the data line transmits information which is in analog and/or digital form.

16. Apparatus according to claim 14 wherein standard communications protocols are used for the transmission of information between two components via the data line.

17. Apparatus according to claim 14 wherein the information is transmitted serially from point to point by means of self-timed encoding.

18. Apparatus according to claim 14 wherein the information is transmitted in the standard S/P-DIF format.

* * * * *

UNITED STATES PATENT AND TRADEMARK OFFICE
CERTIFICATE OF CORRECTION

PATENT NO. : 6,009,491
DATED : December 28, 1999
INVENTOR(S) : Rooppel et al

It is certified that error appears in the above-identified patent and that said Letters Patent is hereby corrected as shown below:

In the <u>cover page</u>, under the heading <u>Inventors</u>, change "Hildensheim" to read as - - Flieden - -.

Signed and Sealed this

Twenty-seventh Day of February, 2001

Attest:

NICHOLAS P. GODICI

*Attesting Officer*     *Acting Director of the United States Patent and Trademark Office*